A. G. LE CHATELIER.
BLOWPIPE.
APPLICATION FILED SEPT. 10, 1908.
1,032,071.
Patented July 9, 1912.
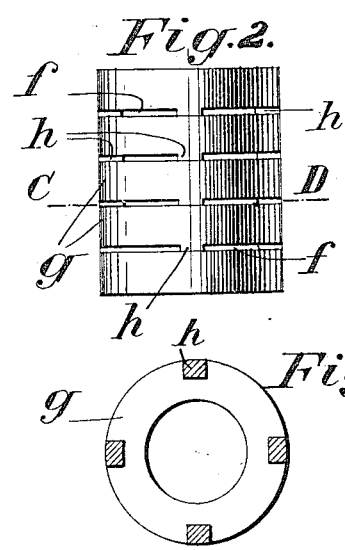
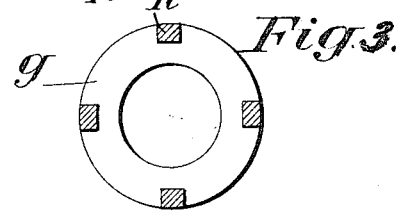
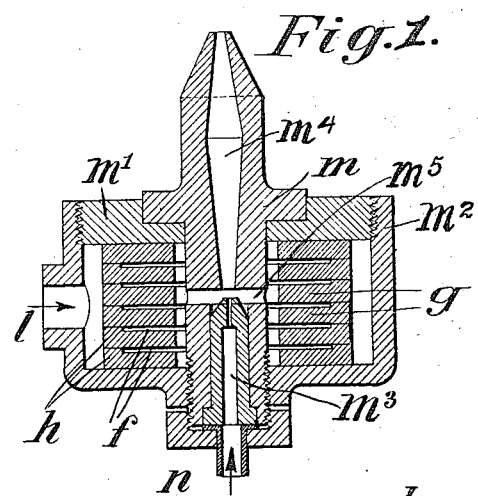
Witnesses:
C. Heymann
L. Waltman
Inventor
André Gabriel Le Chatelier.
by B. Singer Attorney.

UNITED STATES PATENT OFFICE.

ANDRÉ GABRIEL LE CHATELIER, OF MARSEILLE, FRANCE.

BLOWPIPE.

1,032,071.    Specification of Letters Patent.    Patented July 9, 1912.

Application filed September 10, 1908. Serial No. 452,492.

*To all whom it may concern:*

Be it known that I, ANDRÉ GABRIEL LE CHATELIER, a citizen of the French Republic, and resident of Marseille, France, have invented certain new and useful Blowpipes, of which the following is a specification.

In blow pipes in which oxygen is employed as the burning element it is necessary particularly in the case of oxy-acetylene blow pipes to interpose in the passages through which the gases are conveyed to the mixing chamber a device capable of checking the explosion that may occur in these passages in consequence of a defect in the action of the blow pipe and spread to the generators. With this object it has been usual to make use of porous bricks, which have the disadvantage of being somewhat fragile, or of pipes of a certain length, in which the gases can remain for a certain time superposed, without mixing. This latter method is not sufficiently efficacious and does not afford the complete necessary guarantee of efficiency and safety.

The purpose of this invention is to effect an arrangement by means of which the explosion is always reliably checked. It is based on the property possessed by narrow passages of retarding and arresting the spreading of the explosion of combustible mixtures by reason of the cooling action of their sides on the flame. For combustible mixtures containing oxygen only very narrow or capillary passages with an opening only a few tenths of a millimeter in width are capable of checking the course of the explosion: particularly when an oxy-acetylenic mixture is used, the distance between the sides of the passage must be less than two tenths of a millimeter. In this arrangement for arresting explosion different devices may be employed. Thus in the accompanying drawing provided by way of example one form of this device is illustrated.

Figure 1 is a central sectional view of one form and embodiment of my invention; Fig. 2 is an elevation view of a checking device removed from the mixing chamber; the same being of similar construction to the checking device shown in Fig. 1, but differently proportioned. Fig. 3 is a sectional view of the checking device, taken on line C—D, of Fig. 2.

The most practical way of carrying out the invention consists in sub-dividing the diaphragms into elements by the juxtaposition of which owing to the provision of studs or blocks, capillary holes or slots are produced.

Fig. 2 illustrates a cylindrical structure, or checking device, obtained by putting together annular elements or disks $g$ furnished with studs or projections $h$. Any other proper form of checking device may be used and after being put together, the elements if of metal can be soldered so as to form a single block.

The disks may be made of metal or of ceramic or any other suitable material. Metal has the advantage of enabling a more precise adjustment to be effected and in many cases aluminium would be suitable by reason of its lightness. If the checking device were placed at a certain distance from the mixing chamber of the blow pipe the explosion which begins in this mixing chamber might spread so rapidly that the efficacy of the checking device would be reduced. It is therefore advisable that the checking device should be placed in proximity to this mixing chamber and the device illustrated is particularly suitable for this purpose. Fig. 1 represents a blow pipe thus arranged. The combustible gas enters at $l$ through the casing of the cylindrical checking device $g$ and after passing through the capillary passages $f$ enters the injector $m$ where it mixes with the oxygen that enters through the pipe $n$. The injector $m$ extends through a head $m'$, which head is threaded in a casing $m^2$ having the gas admitting opening $l$. The casing has an opening at one end to admit the gas supporting combustion. A nipple $m^3$ discharges into the inner end of the injector, the said injector having a longitudinally disposed passage $m^4$ for the mixed gas and combustion supporting medium. The injector $m$ is provided with a transverse passage $m^5$ which establishes communication between the opening or inlet $l$, through the medium of the slots $f$, and communicates directly with the nipple or nozzle $m^3$ and with the passage $m^4$.

The explosion arresting device specially considered in connection with blow pipes may obviously be employed in any other apparatus in which it may be necessary to arrest the course of explosion of any explosive gas or gaseous mixture whatever.

Having now fully described my said in- vention, what I claim and desire to secure by Letters Patent, is:—

1. The combination of a blow pipe injector, a head to which said injector is applied and through which it extends, a casing to which the head is attached, the said casing having a combustible gas supply opening in the side wall thereof and a combustion supporting gas supply opening in the end thereof opposite the head, a nipple in the inner end of the injector, the said injector having a longitudinally disposed passage for the mixed gas and combustion supporting medium, and a transversely disposed opening in communication with the passage, and a plurality of disks having capillary openings therebetween in communication with the gas supply opening for the admission of the gas to the transverse opening in the injector, the said disks having central bores or openings, the walls of which surround that portion of the nipple extending within the casing.

2. The combination of a blow pipe injector, a casing into which a portion of the injector extends, the said injector having a transversely disposed opening within the casing and a longitudinally disposed passage communicating therewith in a portion extending without the casing, a series of disks having apertures the walls of which encircle the injector within the casing, the said disks having capillary passages therebetween extending from the edges to the interior thereof, means for supplying gas to the casing external of the edges of the disks, and means for supplying oxygen across the transversely disposed opening into the longitudinally disposed passage of the injector.

3. The combination of a blow pipe injector having threads on an end portion, a casing through which the injector is threaded, said injector having a transversely disposed aperture and a longitudinally disposed passage in communication, a series of disks in the casing having apertures through which the injector extends, the said disks having capillary passages therebetween for the passage of gas from the edges of said disks to the apertures thereof, and a nozzle for supplying oxygen having its discharging orifice at the junction of the transversely disposed aperture and the longitudinally disposed passage of the injector.

In testimony whereof I have hereunto set my hand in presence of two witnesses.

ANDRÉ GABRIEL LE CHATELIER.

Witnesses:
JEAN THLACK,
MARIUS MOURUS.

Copies of this patent may be obtained for five cents each, by addressing the "Commissioner of Patents, Washington, D. C."